United States Patent
Chang et al.

(10) Patent No.: US 7,577,144 B2
(45) Date of Patent: Aug. 18, 2009

(54) DYNAMIC NETWORK ADDRESS TRANSLATION SYSTEM AND METHOD OF TRANSPARENT PRIVATE NETWORK DEVICE

(75) Inventors: Hung-chun Chang, Banchiau (TW); Ming-Deng Hsieh, Kaohsiung (TW); Chien-Chao Tseng, Hsinchu (TW); Hung-Ming Tsai, Sanchung (TW)

(73) Assignee: Industrial Technology Research Institute, Chutung (TW)

( * ) Notice: Subject to any disclaimer, the term of this patent is extended or adjusted under 35 U.S.C. 154(b) by 1017 days.

(21) Appl. No.: 10/442,161

(22) Filed: May 21, 2003

(65) Prior Publication Data
US 2004/0100976 A1    May 27, 2004

(30) Foreign Application Priority Data
Nov. 26, 2002    (TW) ............................... 91134368 A

(51) Int. Cl.
*H04L 12/28* (2006.01)
*H04L 12/56* (2006.01)
(52) U.S. Cl. ...................................... 370/392; 709/238
(58) Field of Classification Search ................. 370/401, 370/400, 389, 352
See application file for complete search history.

(56) References Cited

U.S. PATENT DOCUMENTS

| | | | | |
|---|---|---|---|---|
| 6,252,952 B1* | 6/2001 | Kung et al. | ............... | 379/114.1 |
| 6,298,063 B1* | 10/2001 | Coile et al. | ................. | 370/401 |
| 7,068,655 B2* | 6/2006 | March et al. | ................. | 370/392 |
| 7,072,332 B2* | 7/2006 | D'Souza | ..................... | 370/352 |
| 7,139,841 B1* | 11/2006 | Somasundaram et al. | ... | 709/245 |
| 7,224,979 B2* | 5/2007 | Singhal et al. | ........... | 455/456.1 |
| 2002/0040397 A1* | 4/2002 | Choi | ......................... | 709/226 |
| 2003/0214955 A1* | 11/2003 | Kim | ......................... | 370/400 |
| 2003/0227905 A1* | 12/2003 | Bouleros et al. | ............ | 370/352 |

* cited by examiner

*Primary Examiner*—Seema S Rao
*Assistant Examiner*—Wanda Z Russell
(74) *Attorney, Agent, or Firm*—Bacon & Thomas, PLLC

(57) ABSTRACT

The present invention provides a dynamic network address translation system and method of transparent private network device. With the NAT approach, the first device in a public network can be connected to a second device in a private network. The first packet for the connection is sent from the first device in the public network to the second device in the private network. Before establishing the connection, the first device exchanges information between the NAPT router of the private network. The NAPT router maintains its translation table according to the information. Then, the first device sends a connection request to a specific port of the NAPT router, and the packet will be transformed and routed properly to the second device.

9 Claims, 3 Drawing Sheets

DYNAMIC NETWORK ADDRESS TRANSLATION SYSTEM AND METHOD OF TRANSPARENT PRIVATE NETWORK DEVICE

BACKGROUND OF THE INVENTION

1. Field of the Invention

The present invention relates to the technical field of network address translation and, more particularly, to a dynamic network address translation system and method of transparent private network device.

2. Description of Related Art

In the Internet, an IP (Internet Protocol) address typically represents a device, and further represents the source and destination for transferring packets in the network. Currently, the most popular IP technique is known as IPv4 (IP version 4), which is characterized in providing the address length of 32 bits. However, because the number of devices in the network is increased so fast and the address length is restricted, the number of available public IP addresses is getting insufficient. To overcome such a problem, more and more devices are provided with private IP addresses (also known as virtual IP addresses) and utilize the NAT (Network Address Translation) technique to communicate with the devices in the Internet.

The NAT technique is provided to translate the address of an IP packet from an address realm to another address realm. Such a technique is typically applied in communication between two address realms, for example, the communication between a public network (a network using public IP addresses, such as Internet) and a private network (a network using private IP addresses).

The NAT router is a router located between two different address realms, and has two IP addresses associated with the two different address realms, respectively. Taking the address translation between the public network and private network as an example, the NAT router has a public IP address, known as an outer IP address, which can be correctly routed in the public network, and a private IP address, known as an inner IP address, which can be correctly routed in the private network.

In the NAT table, there are recorded with the rules for performing address translation and the translating manner. When receiving an IP packet, the NAT router determines whether the source IP or destination IP address in the header of the IP packet matches with the address translation rules. If they are matched, an address translation is performed based on the content of the NAT table; otherwise, no address translation is performed.

There is also provided a NAPT (Network Address and Port Translation) technique, which is similar to the NAT technique except that the address part to be processed includes an IP address and a port number (TCP port number or UDP port number), instead of only one IP address employed in the NAT technique. When a NAPT router receives an IP packet, it will check whether the [source IP address:source port number] or [destination IP address:destination port number] in the IP header of the packet matches with the address translation rules. If they are matched, an address translation is performed based on the content of the NAPT table; otherwise, no address translation is performed. With such a NAPT technique, a plurality of devices in the private network can share a public outer IP address (i.e., the outer IP address of the NAPT router) for communicating with devices in the public network.

The NAPT technique can normally process the private network originated connection, but not the public network originated connection. As known, the outer IP address represents all devices in the private network. When an IP packet whose destination IP address is the outer IP address of the router is routed to the router, the router will determine whether to perform a network address translation on this packet based on the content of the NAPT table and, if translation is done, route this packet to the device in the public network. In case of a connection originated from the public network, the device in the public network must first issue a connection request packet whose destination IP address includes a network address and a port number. However, the NAPT table does not have data corresponding to the network address and a port number. Therefore, the router does not perform an address translation. Although the packet is received by the router, the router will reject the connection request due to being unable to process such a port number request, resulting in that the public network originated connection can not be normally routed to the device in the private network.

To overcome the aforementioned problem, RFC2663 proposes an extension system of network address translation, known as bi-direction NAT, which utilize a DNS-ALG (Domain Name System—Application Level Gateway) and a NAT router to achieve an effect of bi-directional connection. However, such a system suffers a disadvantage in that each public network originated connection must use an additional public outer address.

Port forwarding is an alternative method for solving the public network originated connection problem. This method has been widely applied in an IP sharing device, which is a NAT router installed at the ADSL or cable modem user side for allowing a public outer IP address to be shared by a plurality of devices. This method utilizes the NAPT mechanism together with the pre-established NAPT table to make the specific port number of the router's outer IP address correspond to the same port number of a specific device in the private network. When the device in the public network sends a connection request packet to this specific port number of the NAPT router, the router will perform a network address translation on the packet based on the content of the NAPT table, so as to translate the destination IP address of the packet from the IP address of the router to the IP address of the specific device in the private network without changing the port number, thereby correctly routing the packet to the specific device in the private network and thus completing the public network originated connection.

Unfortunately, the above system suffers a disadvantage in having to pre-establish the content of the NAPT table. Therefore, the services from the public network originated connection are restricted to those provided by the pre-established port numbers. In particular, because a port number of the router's outer IP address can only correspond to a specific device in the private network, the other devices in the private network cannot be provided with connection service via this port number. For example, if there are 3 devices in a private network providing web services on TCP port number 80, only one device can have its TCP port 80 mapped to TCP port 80 on the external interface of the NAT router. This is so-called Port Collision problem.

U.S. patent publication 20010006523 discloses a "Method and system for communication to a host within a private network" which provides an intermediate system in a sub-network of the public network for operating with the domain name server. This intermediate system can check all packets from the sub-network and suitably process the same (possibly perform a network address translation). Furthermore, specific channels are pre-established between the intermediate system and the NAPT router to be communicated in the private network. The device in the sub-network can utilize the intermediate system and channels to achieve a connection to a specific private network. However, in this patent, each sub-network that requires such a function in the public network must be provided with an intermediate system, and channels between each intermediate system and all NAPT routers possibly connected thereto in the private network must be established. As a result, the expandability is unsatisfactory.

Therefore, it is desirable to provide an improved network address translation system and method to mitigate and/or obviate the aforementioned problems.

SUMMARY OF THE INVENTION

The object of the present invention is to provide a dynamic network address translation system and method of transparent private network device, in which the public network originated connection can be performed by dynamically changing the NAPT table, and all devices in the private network can share only one public outer IP address.

According to one aspect, the present invention which achieves the object relates to a dynamic network address translation method of transparent private network device for allowing a first device in a public network to connect to a second device in a private network via a NAPT router. The method comprises: (A) the first device in the public network sending a domain name request packet to inquiry an IP address corresponding to domain name of the second device; (B) the NAPT router intercepting the domain name request packet and responding a domain name reply packet having an outer IP address; (C) the first device using the outer IP address as destination address to send a connection registration request packet having a service port corresponding to the second device to the NAPT router; (D) after receiving the connection registration request packet, the NAPT router selecting a data port corresponding to the service port, thereby establishing a translation relation between the outer IP address/data port and the private IP address/service port; and (E) the first device and second device performing bi-directional communication by using the translation relation.

According to another aspect, the present invention which achieves the object relates to a dynamic network address translation system of transparent private network device. The system comprises at least one first device located in a public network and having a public IP address; a private network having at least one public IP address; at least one second device located in the private network and having a domain name, a private IP address and a service port; and a NAPT router located between the public network and the private network for translating public IP address and port of a packet into private IP address and port of the private network. When desiring to connect to the second device, the first device inquiries an IP address corresponding to domain name, and the NAPT router responds a public outer IP address. The first device then uses the outer IP address to register to the NAPT table of the NAPT router. The NAPT router should select a data port for establishing a translation relation between the outer IP address/data port and the private IP address/service port to enable the bi-directional communication between the first device and second device.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
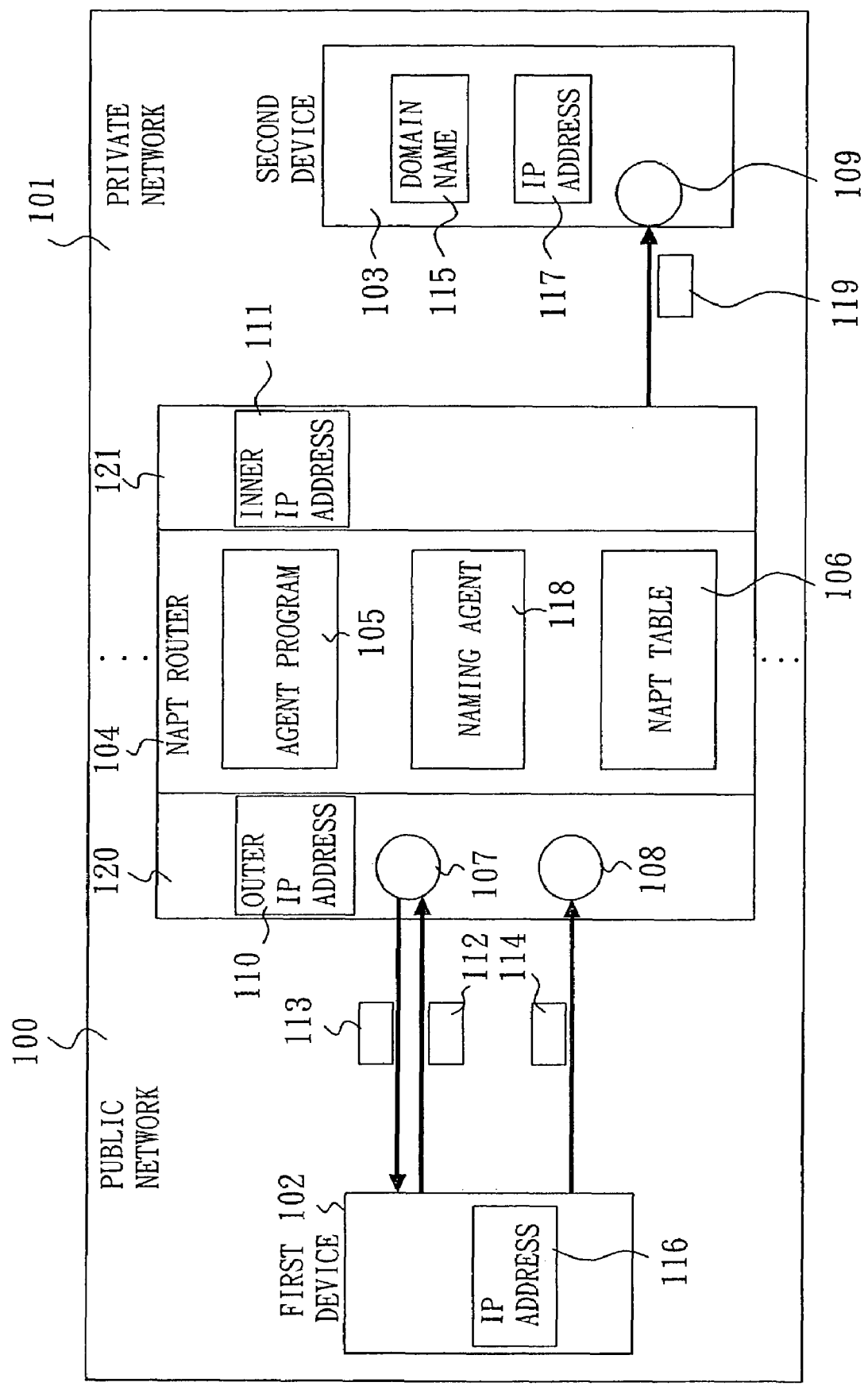
FIG. 1 shows the architecture of a dynamic network address translation system of transparent private network device in accordance with the present invention.

With reference to FIG. 1, there is shown a dynamic network address translation system of transparent private network device in accordance with the present invention, which includes a public network 100 and a private network 101. The IP address of the device in the public network 100 is public IP address. The IP address of the device in the private network 101 is private IP address. A NAPT router 104 (hereinafter abbreviated as router 104) is provided between the public network 100 and the private network 101. The public IP address of a first device 102 in the private network 100 is denoted as first IP address 116. This device 102 is desired to connect a second device 103 in the private network 101, wherein the destination port number for connection is known as service port 109 which is located at the second device 103 in the private network 101. The second device 103 has a private IP address denoted as second IP address 117, and has a second domain name.

The router 104 has an outer interface 120 and an inner interface 121, each having an IP address, named as outer IP address 110 and inner IP address 111 respectively, wherein the outer IP address 110 is a public IP address and the inner IP address 111 is a private IP address. The outer interface 120 provides a registration port 107 and a plurality of dynamically generated data ports 108. The registration port 107 is provided to receive connection registration request packets 112 transmitted from the first device 103. The data port 108 is provided to receive connection request packets 114 transmitted from external devices or receive data after connection is established.

The router 104 has a NAPT table 106 (hereinafter abbreviated as table 106), a NAT agent 105, and naming agent 118. The table 106 is responsible for storing corresponding data of network address translation. The agent 105 is responsible for receiving the connection registration request packet 112, transmitting the connection registration reply packets 112, and updating the table 106 based on the registration request. The naming agent 118 is responsible for processing the domain name service (DNS) of the devices in the private network 101. When the device in the private network 101 performs a DNS lookup to the second domain name 115, the second IP address 117 is obtained. However, when the device in the public network 100 performs a DNS lookup to the second domain name 115, the lookup request is intercepted by the naming agent 118 and the outer IP address 110 is responded.

Figure 2:
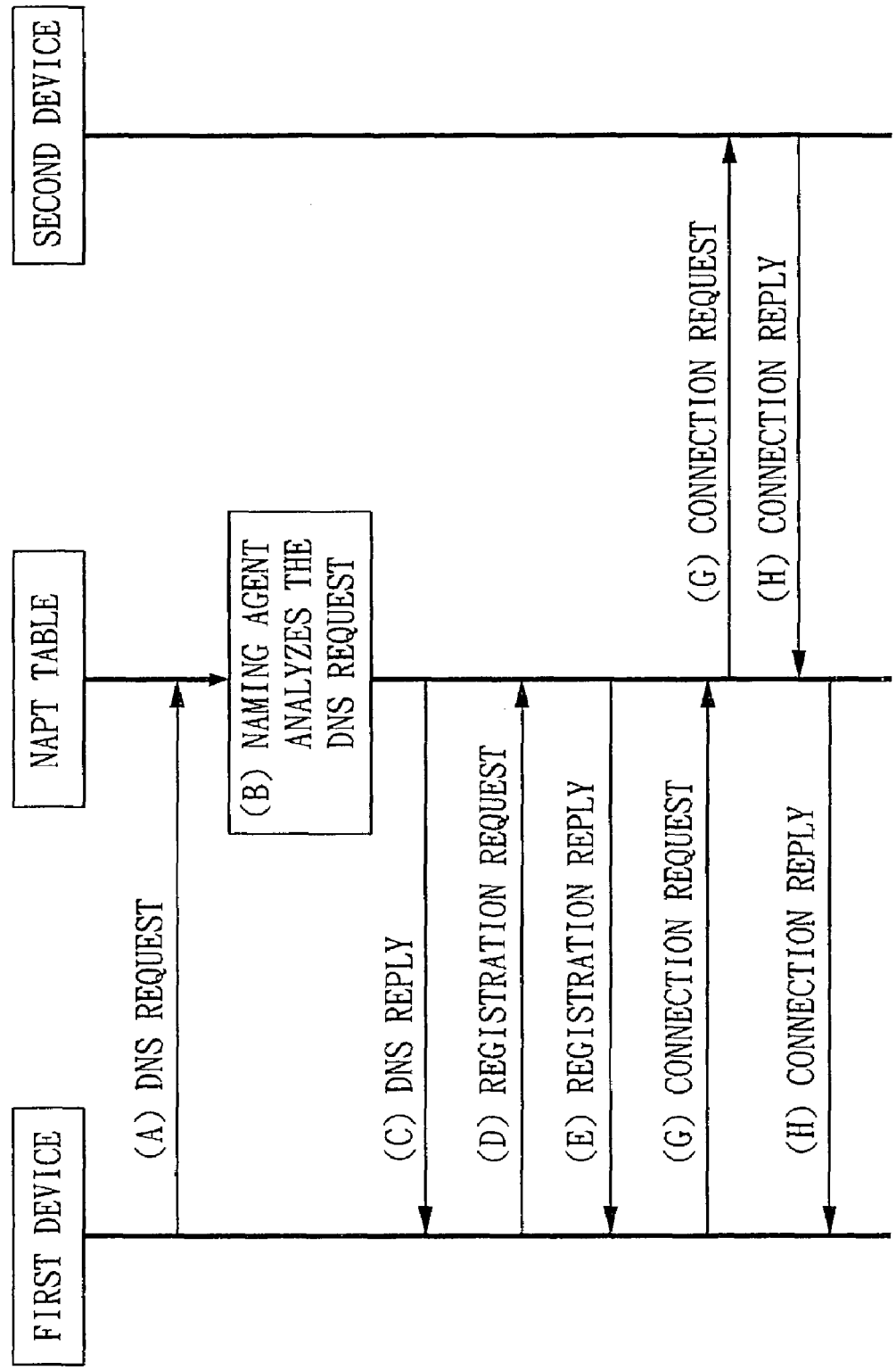
FIG. 2 shows the protocol flow of the dynamic network address translation method of transparent private network device in accordance with the present invention.

In the present system, the first device 102 is aware of the domain name of the second device being the second domain name 115, and the destination port number (service port number 109) of the second device 103 to be connected. The steps of connection are illustrated in FIG. 2, and described as follows:

(A) Because the first device 102 is aware of the domain name of the second device 103, but does not know the IP address of the second device 103, the first device 102 will issue a domain name lookup packet before issuing a connection request to the second device 103, so as to inquiry the IP address corresponding to the second domain name 115.

(B) Due to the hierarchical relation of the domain name service, this domain name lookup packet will be routed to the private network 101 associated with the second device 103. When this packet passes the router 104 in the private network, the naming agent 118 of the router 104 will intercept and process the packet.

(C) The naming agent finds that the domain name inquired by this packet is associated with the device in its private network, and thus sends a DNS reply packet in which the IP address corresponding to the responded domain name is the outer IP address 110.

Figure 3:
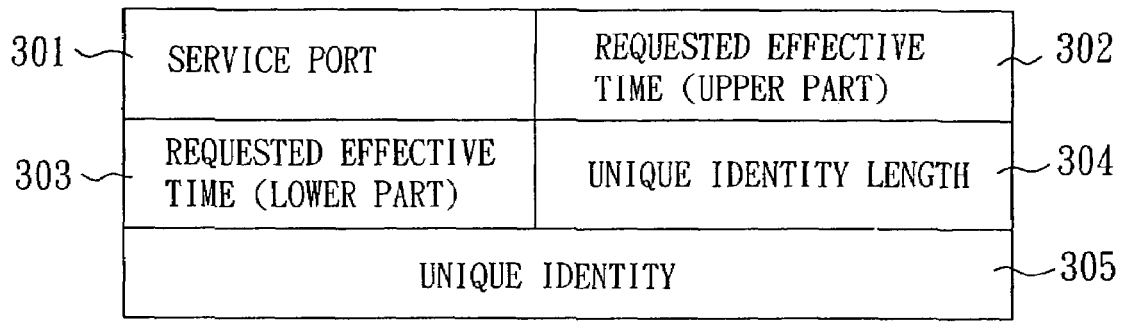
FIG. 3 shows the format of the connection registration request packet in accordance with the present invention.

(D) The first device 102 sends a connection registration request packet 112 to the router 104 for registration. The format of the connection registration request packet 112 is shown in FIG. 3. The service port 301 shown in FIG. 3 corresponds to the service port 109 of FIG. 1. The request lifetime 302 represents the time that the connection-related NAPT data remains in the table 106. The unique identity length 304 represents the length of the unique identity of the second device 103 (in octet). The unique identity 305 represents the second device's unique identity, which is the second domain name 115 of he second device shown in FIG. 1.

The connection registration request packet 112 is an UDP packet whose destination IP address is the outer IP address 110 (obtained from the step (C)) and whose destination port number is the registration port number 107 of the router 104. Therefore, this UDP packet will be routed to the router 104 for being received and processes by the agent program 105 of the router.

Figure 4:
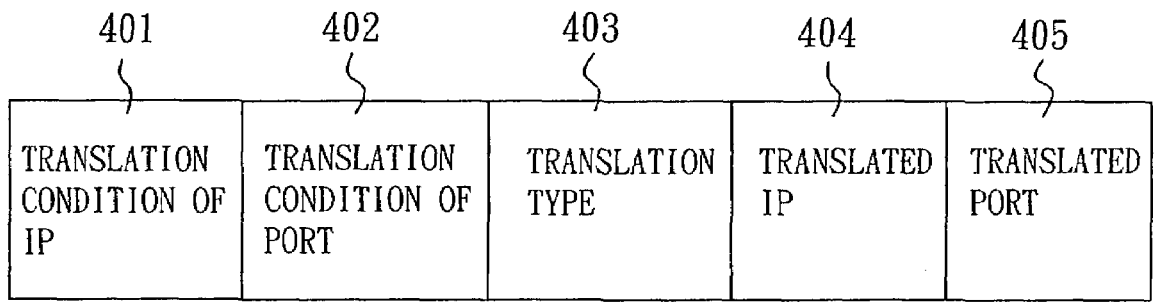
FIG. 4 shows the format of the NAPT table in accordance with the present invention.

(E) When receiving the connection registration request packet 112, if the request is accepted, the agent program 105 of the router 104 randomly selects a free data port 108 from the outer interface 120 for corresponding to service port 109, and adds a translation data item in the NAPT table 106. The format of the table 106 is illustrated in FIG. 4. The translation type 403 of the translation data item is destination NAT. The translation condition of IP 401 is outer IP address 110. The translation condition of port 402 is data port 108. The translated IP 404 is second IP address 117. The translated port 405 is service port 109. That is, this translation data item correspond to a destination network address translation, which makes [destination IP address:destination port] to be translated from [outer IP address 110:data port 108] to [second IP address 117:service port 109].

Figure 5:
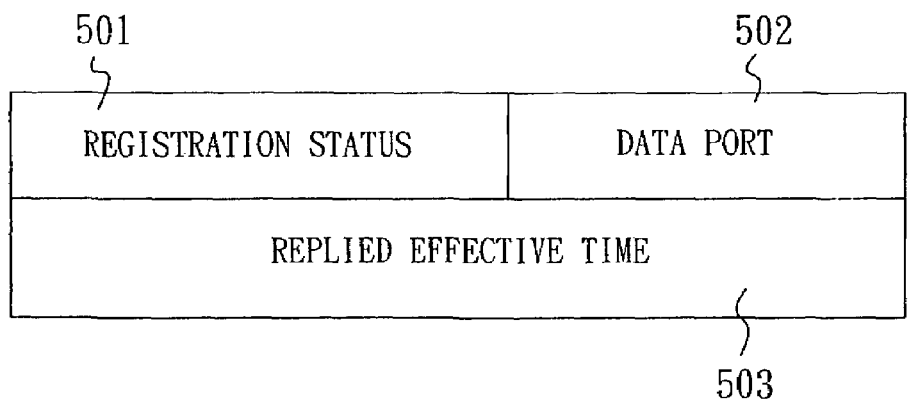
FIG. 5 shows the format of the connection registration reply packet in accordance with the present invention.

(F) The agent program 105 sends a connection registration reply packet 113 whose destination IP address is the first IP address 116. The format of the packet is illustrated in FIG. 5. The registration status 501 can be '0' representing a registration failure or '1' representing a registration success. The replied effective time 503 is the period of time, determined by the agent program 105, in which the connection-related NAPT data remains in the table 106. This time period is smaller than or equal to the requested effective time 302. The data port 502 shown in FIG. 5 is the data port 108 of FIG. 1.

(G) When receiving this connection registration reply packet 113, the fist device 102 sends a connection request packet 114 whose destination port is the data port 108. This packet will be routed to the router 104. Because the table 106 already has the corresponding translation data, a NAPT process is performed on this packet by the router 104, so as to translate [destination IP address:destination port] to [second Ip address 117:service port 109]. After translation, the translated connection request packet 119 will be correctly routed to the second device 103. The destination port of the packet is the service port 109, which is the port of the second device originally to be connected with the first device.

(H) The connection reply packet responded from the second device 103 to the first device 102 will be processed by the router 104 in a manner similar to processing the packet of private network originated connection by the conventional NAPT router. That is, a source NAT is performed to use the outer address 110 as a source IP address for connection to outside. Accordingly, the first device and the second device can be connected and data transfer can be achieved bi-directionally.

With the above steps, the present system can correctly process the public network originated connection, and the devices in the private network 101 can share one IP address, that is, the outer IP address 110 of the router 104.

In view of the foregoing, it is known that the present invention is able to enable the devices in the private network accept the connection request originated from the public network, so that all devices in the private network share only one public IP address (this IP address is the outer IP address of the router). Accordingly, the problem in that public network originated connection cannot be routed is eliminated. Furthermore, in the present system, the same service (service with the same service port) can be provided for external connection by different devices in the private network.

Although the present invention has been explained in relation to its preferred embodiment, it is to be understood that many other possible modifications and variations can be made without departing from the spirit and scope of the invention as hereinafter claimed.

What is claimed is:

1. A dynamic network address translation method of transparent private network device for allowing a first device in a public network to connect to a second device in a private network via a NAPT router, comprising:

(A) the first device in the public network sending a domain name request packet to inquiry an IP address corresponding to domain name of the second device;

(B) the NAPT router intercepting the domain name request packet and responding a domain name reply packet having an outer IP address;

(C) the first device using the outer IP address as destination address and a registration port corresponding to the NAPT router as a destination port-to send the NAT router a connection registration request packet having a service port corresponding to the device;

(D) after receiving the connection registration request packet, the NAPT router selecting a data port corresponding to the service port, thereby establishing a translation relation between the outer IP address/data port and the private IP address/service port; and (E) the first device and second device performing bi-directional communication by using the translation relation.

2. The method as claimed in claim 1, wherein in step (B), the outer IP address is the IP address of an outer interface of the NAPT router.

3. The method as claimed in claim 1, wherein in step (B), the connection registration request packet further has a requested effective time for defining the time period in which connection-related data remains.

4. The method as claimed in claim 1, wherein in step (B), the connection registration request packet is an UDP packet whose IP address is the outer IP address and whose destination port is the registration port of the NAPT router.

5. The method as claimed in claim 1, wherein in step (D), the data port is randomly selected from free data ports in an outer interface of the NAPT router.

6. The method as claimed in claim 1, wherein step (D) further comprises:
   (F) the NAPT router responding a connection registration reply packet;
   (G) after receiving the connection registration reply packet, the first device using the outer IP address and data port as destination IP address and destination port to send a connection request packet, so that the NPT router translates the destination IP address and destination port into the private IP address and service port of the second device, thereby routing the translated connection request packet to the second device; and
   (H) the second device responding a connection reply packet to the first device.

7. A dynamic network address translation system of transparent private network device comprising:
   at least one first device located in a public network and having a public IP address;
   a private network having at least one public IP address;
   at least one second device located in the private network and having a domain name, a private IP address and a service port; and
   a NAPT router located between the public network and the private network for translating public IP address and port of a packet into private IP address and port of the private network, and the NAPT router having one predefined registration port,
   wherein when desiring to connect to the second device, the first device inquiries an IP address corresponding to domain name, and the NAPT router responds a public outer IP address; the first device then sends a connection registration request to the registration port to register to the NAPT table, so as to select a data port in the NAPT router and establish a translation relation between the outer IP address/data port and the private IP address/service port to enable the first device and second device perform bi-directional communication.

8. The system as claimed in claim 7, wherein the data port is randomly selected from free data ports in an outer interface of the NAPT router.

9. The system as claimed in claim 7, wherein the NAPT router has a NAPT table for storing network address translation data to translate the destination IP address and destination port of the packet transmitted from the first device into private IP address and service port of the second device.

* * * * *